Patented Sept. 14, 1926.

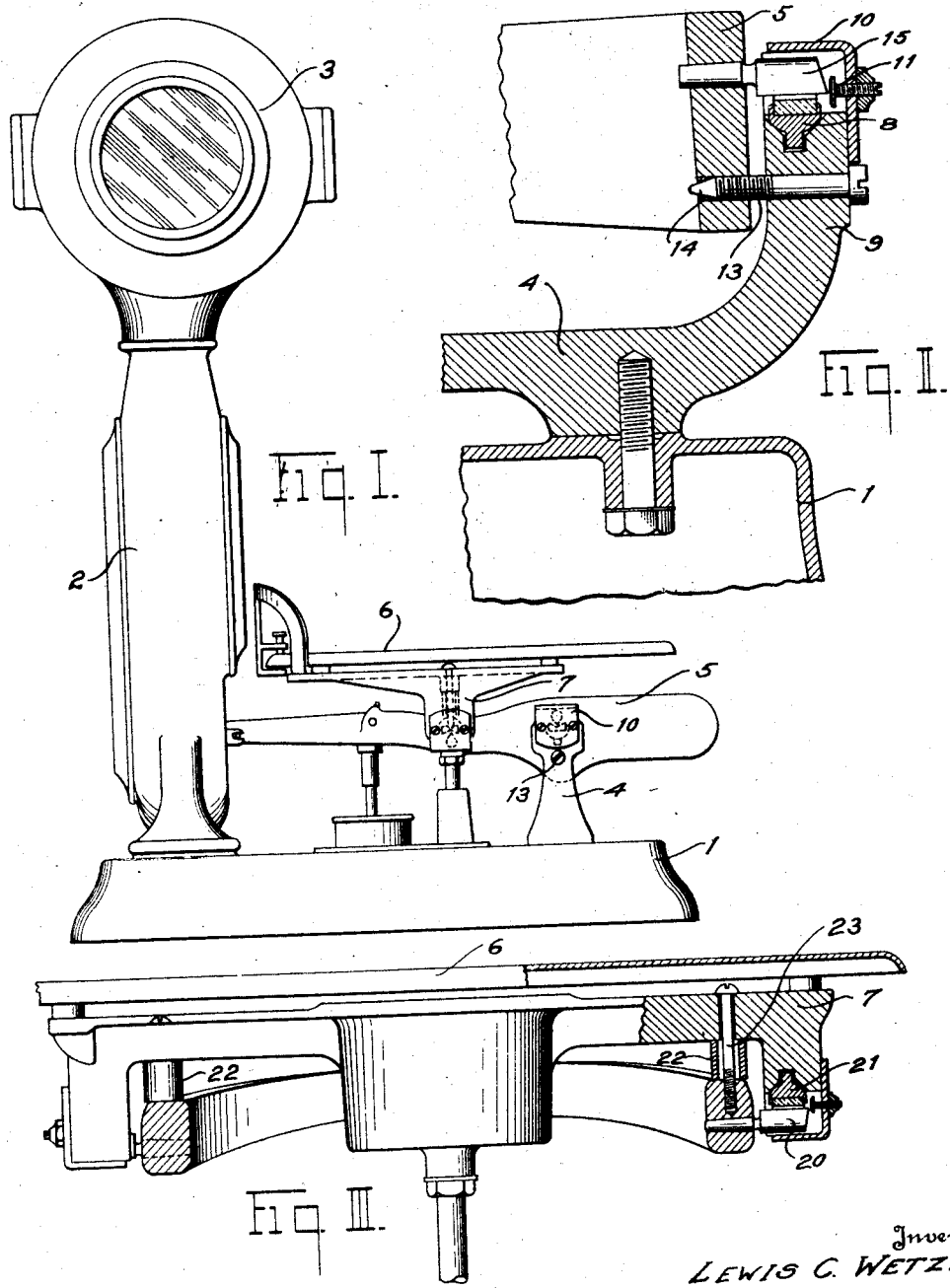

1,600,155

UNITED STATES PATENT OFFICE.

LEWIS C. WETZEL, OF WINDSOR, ONTARIO, CANADA, ASSIGNOR TO TOLEDO SCALE COMPANY, OF TOLEDO, OHIO, A CORPORATION OF NEW JERSEY.

PACKING DEVICE.

Application filed December 3, 1923. Serial No. 678,083.

This invention relates to packing devices, and more particularly to means for packing scales to prevent injury during transportation.

In the packing of scales it is desirable that they be packed as nearly as possible in a condition and relation of parts in which they are to be used. It is important, however, that the pivots should not rest in their bearings when the scale is packed, as the delicate knife edges, if engaged with the bearings, would become dulled as a result of the shocks received by the scale during transportation.

One of the principal objects of my invention is the provision of simple yet effective means for raising or blocking up the lever or beam to relieve the knife edge pivots from contact with the bearings and securely locking it against movement.

Another object is to provide a simple means for blocking up or raising a lever, which means may be applied by an unskilled workman without the aid of special tools.

Another object is the provision of means for retaining the lever and platform spider in positions preventing the contact of the pivots with their bearings and also preventing sidewise movement of the members, thereby precluding any possibility of damage to the pivots or their bearings resulting from rough handling during transportation.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a side elevational view of a weighing scale of a well known type embodying my invention;

Figure II is an enlarged fragmentary sectional view through a fulcrum supporting member and adjacent parts of the scale; and Figure III is an enlarged fragmentary view, partly in section, of the platform spider and adjacent part of the lever, showing the means for retaining these members in position for shipment.

Referring to the drawings, I have shown my invention as applied to a well known type of weighing scale, but it is to be understood that my invention is adapted for use with any similar devices having pivots with knife edges. The scale herein shown not being part of my invention per se, it will be described only in such detail as to illustrate the application of my device thereto.

The scale consists of a base 1 upon one end of which is supported an upright housing 2 surmounted by a cylindrical casing 3. Supported upon the base 1 is a base horn 4 which forms a fulcrum stand for the main lever 5 of the scale. This lever supports a platter or commodity-receiver 6 through the medium of a spider 7. One end of the lever 5 projects into the housing 2 and is adapted to be connected to a load-counterbalancing and indicating means (not shown) of any suitable construction.

The beam or lever 5 is fulcrumed in the base horn 4 in any suitable manner, that shown consisting of universally mounted bearing pieces 8 resting in depressions in the uprights 9 of the base horn, the bearing pieces normally supporting the knife edge pivots 15 of the lever. Dust protectors or covers 10 surmount the uprights 9 and carry thrust members 11 to prevent excessive sidewise movement of the lever. The lever 5 has threaded apertures beneath the fulcrum pivots 15, the apertures being adapted, when the lever is slightly raised from its bearings, to be brought into registration with perforations in the uprights 9.

When the scale is to be packed for shipment, lifting and locking screws having tapered ends 14 are passed through the perforations and threaded into the apertures in the lever 5. When the tapered ends 14 move into the apertures the lever is first raised, so that the pivots 15 are lifted from their bearings. The screws are then turned up until their heads are drawn against the uprights 9, thus securely locking the lever in its raised position, shown in Figure II. It is, of course, understood that there is a screw 13 at each side of the lever and that the screws act in opposition to each other. By this means the lever is supported in a position relieving the bearings and pivots from all contact, and sidewise movement of the lever, which, if permitted, would result in the pivot points striking and rubbing against the thrust members 11 and the points becoming broken and the thrust members scored, is also prevented.

If desired, the parts may be so arranged that the screws 13 are threaded inwardly through the uprights 9 and engage perforations of less diameter in the lever.

For use in conjunction with the lever raising and locking means above described, I have provided means for relieving the load pivots of the weight of the platter and supporting spider. As more particularly shown in Figure III, the lever 5 has the load pivots 20 normally in contact with the bearing pieces 21 carried by the spider 7 to pivotally support the same. When the scale is packed a pair of collars 22 are interposed between the lever 5 and the spider 7 to slightly separate the pivots 20 and bearing pieces 21. Screws 23 are then passed through the spider 7 and the collars 22 and their lower ends threaded into the lever 5 to hold the spider against movement relative to the lever.

From the foregoing description it will be obvious that the scale may be subjected to rough handling during transportation without resulting in damage to the pivots and bearings. Upon delivery of the scale it may readily be placed in weighing condition by simply removing the screws 13 and 23 from the lever 5 and the collars 22 from between the lever and the spider. These simple operations permit the pivots 15 and 20 to engage the bearing pieces 8 and 21 positioned in the fulcrum supports and the platter respectively, the lever and spider again assuming their normal or weighing positions.

The embodiment of my invention herein shown and described is to be regarded as illustrative only, and it is to be understood that the invention is susceptible to variation, modification and change within the spirit and scope of the subjoined claims.

Having described my invention, I claim:

1. In a scale, in combination, a lever, supports for the lever, and means co-operating with the lever and its supports to fixedly retain the lever in a substantially central position laterally relative to the supports whereby damage to lateral thrust pivots and bearings may be prevented.

2. In a scale, in combination, a lever having pivots, supports for the levers having bearings normally supporting the lever pivots, and means co-operating with the lever and its supports to slightly elevate the lever off its bearings and fixedly retain it in a substantially central position laterally relative to the supports whereby damage to lateral thrust pivots and bearings may be prevented.

3. In a scale, in combination, a lever having pivots, supports for the lever having bearings normally supporting the lever pivots, and means including a plurality of threaded members having tapered ends cooperating with the lever and its supports to slightly elevate the lever off its bearings and fixedly retain said lever in a substantially central position relative to the supports.

4. In a scale, in combination, a lever having pivots, a support for the lever having bearings normally supporting the lever pivots, and means including a threaded member passing through the lever supports and having a tapered extremity engaging the lever to slightly raise the lever pivots off their bearings.

5. In a scale, in combination, a lever, supports for the lever, and means including a threaded member carried by the lever and engaging openings in said supports to retain the lever in a slightly elevated position above the supports.

6. In a scale, in combination, a lever having pivots, supports for the lever having bearings normally supporting the lever pivots, and a plurality of threaded members passing through the supports and threaded into the lever to slightly raise the lever pivots off their bearings and prevent sidewise movement of the lever relative to its supports.

7. In a scale, in combination, a lever having pivots, supports for the lever having bearing pieces normally supporting the lever pivots, said supports having perforations therethrough, said lever having threaded apertures adapted to be brought into registration with said perforations, and a plurality of threaded members having tapered ends, said members passing through said perforations and being threaded into the apertures of the lever and having heads engaging the sides of the lever supports to relieve the pivots of contact with their bearings and to fixedly retain the lever against movement relative to said supports.

8. In a scale, in combination, a lever having pivots, means carried by the pivots adapted to receive commodities to be weighed, and means including a threaded member whereby the commodity-receiving means is slightly lifted from the lever pivots and retained against further movement relative to said lever.

9. In a scale, in combination, a lever having pivots, commodity-receiving means having bearing pieces normally resting upon said pivots, means whereby the commodity-receiving means is supported slightly above the pivots, and means including a threaded member for retaining said commodity-receiving means against further movement relative to said lever.

10. In a scale, in combination, a lever having pivots, commodity-receiving means having bearing pieces normally resting upon said pivots, means including a collar whereby the commodity-receiving means is supported slightly above the pivots, and means including a threaded member passing through the collar for retaining said commodity-receiving means against movement relative to said lever.

11. In a scale, in combination, a lever having pivots, a platform supporting spider having bearing pieces normally resting upon said pivots, means including a collar interposed between the spider and the lever to support said spider in slightly elevated position, and means including a threaded member passing through the collar for retaining said spider against movement relative to said lever.

12. In a device of the class described, in combination, a pair of members connected by means of a knife edge pivot and bearing, and means including a screw threaded into one of said members and having a portion engaging the other of said members to separate the pivot from its bearing and hold the members in fixed relation.

LEWIS C. WETZEL.